US012127986B2

(12) United States Patent
Zapari et al.

(10) Patent No.: US 12,127,986 B2
(45) Date of Patent: Oct. 29, 2024

(54) MECHANISM FOR THE TRANSFER OF MEDICAL DEVICE TO BED RAIL

(71) Applicant: DEPUY IRELAND UNLIMITED COMPANY, Co Cork (IE)

(72) Inventors: Fernando Zapari, Fort Wayne, IN (US); Bryan Rose, South Whitley, IN (US); Kevin Cooney, New Haven, IN (US); Michael Jones, North Webster, IN (US); Robert Rogala, North Webster, IN (US); Pere Ventura, Warsaw, IN (US); Travis Crowe, Fort Wayne, IN (US)

(73) Assignee: DEPUY IRELAND UNLIMITED COMPANY, Co Cork (IE)

( * ) Notice: Subject to any disclaimer, the term of this patent is extended or adjusted under 35 U.S.C. 154(b) by 383 days.

(21) Appl. No.: 17/546,520

(22) Filed: Dec. 9, 2021

(65) Prior Publication Data

US 2023/0181395 A1 Jun. 15, 2023

(51) Int. Cl.
*A61G 7/05* (2006.01)
*A47B 23/02* (2006.01)

(52) U.S. Cl.
CPC .......... *A61G 7/0524* (2016.11); *A47B 23/025* (2013.01); *A61G 7/0503* (2013.01)

(58) Field of Classification Search
CPC .. F16M 11/041; A61G 7/0524; A61G 7/0503; A47B 23/025
USPC .......................................................... 248/689
See application file for complete search history.

(56) References Cited

U.S. PATENT DOCUMENTS

| | | | | |
|---|---|---|---|---|
| 5,306,109 A * | 4/1994 | Kreuzer | F16M 11/041 414/349 |
| 2010/0299890 A1* | 12/2010 | Doyle | F16B 2/185 24/457 |
| 2011/0121149 A1 | 5/2011 | Herskovic | |
| 2023/0181395 A1* | 6/2023 | Fernando | A47B 23/025 414/397 |

OTHER PUBLICATIONS

International Search Report and Written Opinion for PCT/EP2022/084598 mailed on Mar. 9, 2023.

* cited by examiner

*Primary Examiner* — Todd M Epps
(74) *Attorney, Agent, or Firm* — Kramer & Amado, P.C.

(57) ABSTRACT

A medical device transfer system configured to transfer a medical device to a bed rail, including: a transfer assembly configured to be attached to the medical device including: a clamp latch; a cart latch; a clamp engagement element configured to engage a clamp fixture; and a cart engagement opening; and a cart engagement assembly configured to engage the transfer assembly and to connect to a cart, the cart engagement assembly comprising a transfer assembly engagement element, wherein the transfer assembly engagement element is configured to engage the cart engagement opening, wherein clamp latch is configured to lock and unlock the transfer assembly to the clamp fixture, and wherein the cart latch is configured to lock and unlock the cart engagement assembly to the transfer assembly.

28 Claims, 11 Drawing Sheets

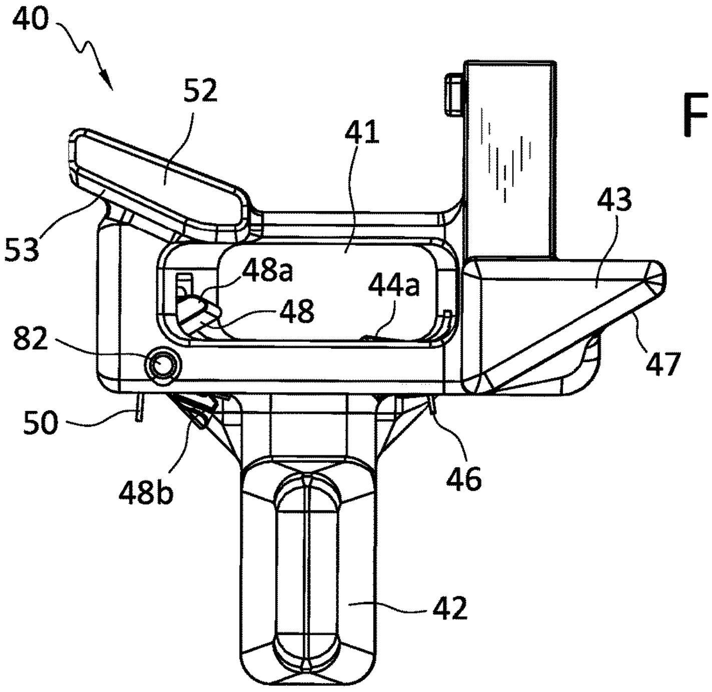
FIG. 8A
FIG. 8B
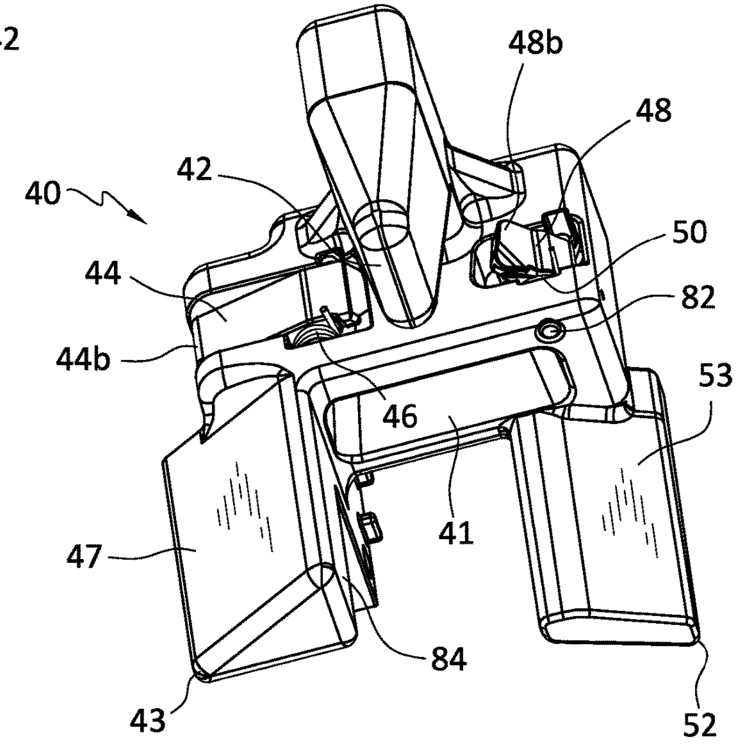
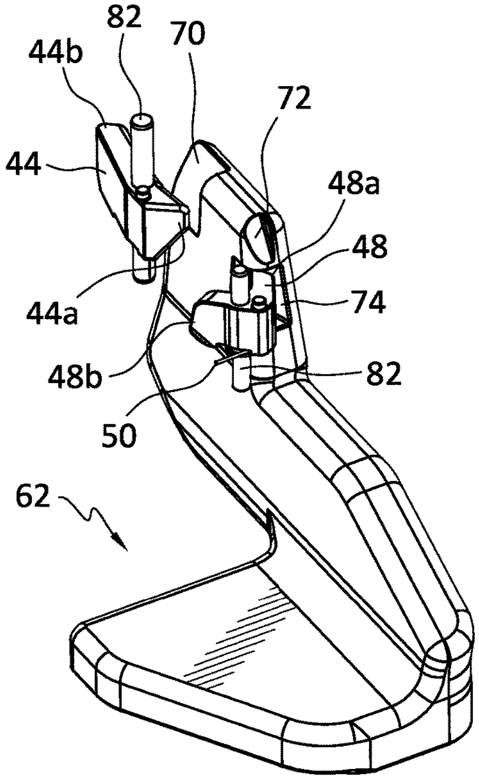
FIG. 8C

MECHANISM FOR THE TRANSFER OF MEDICAL DEVICE TO BED RAIL

TECHNICAL FIELD

Various exemplary embodiments disclosed herein relate generally to a mechanism for the transfer of a medical device to a bed rail.

BACKGROUND

Various medical devices may be brought to a patient on a bed. Such medical devices include a robotic system, a diagnostic system, an imaging system, etc. The medical device may have a cart that carries the medical device from location to location so that it might be brought to the patient rather than taking the patient to the medical device. The medical device in some situations may remain on the cart. In other situations, it may be beneficial to attach the medical device to a bed rail of the patient. The medical device may then be used as needed with the patient in the bed. Then after the use of the medical device has ended, the medical device may be removed from the bed and place back on the cart for deployment at another location or for a later procedure.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a medical device transfer system configured to transfer a medical device to a bed rail, including: a transfer assembly configured to be attached to the medical device including: a clamp latch; a cart latch; a clamp engagement element configured to engage a clamp fixture; and a cart engagement opening; and a cart engagement assembly configured to engage the transfer assembly and to connect to a cart, the cart engagement assembly including a transfer assembly engagement element, wherein the transfer assembly engagement element is configured to engage the cart engagement opening, wherein clamp latch is configured to lock and unlock the transfer assembly to the clamp fixture, and wherein the cart latch is configured to lock and unlock the cart engagement assembly to the transfer assembly.

Various embodiments are described, wherein the clamp fixture includes a clamp engagement opening configured to receive the clamp engagement element.

Various embodiments are described, wherein the clamp engagement member is tapered and the clamp engagement opening is tapered.

Various embodiments are described, wherein the transfer assembly engagement member is tapered and the cart engagement opening is tapered.

Various embodiments are described, wherein the clamp latch is configured to engage a clamp latch opening in the clamp fixture when the cart engagement assembly disengages from the transfer assembly.

Various embodiments are described, wherein the clamp latch is configured to disengage the clamp latch opening in the clamp fixture when the cart engagement assembly engages the transfer assembly.

Various embodiments are described, wherein the transfer assembly includes clamp latch biasing member configured to bias the clamp latch towards engaging the clamp latch opening in the clamp fixture.

Various embodiments are described, wherein the cart latch is configured to engage a cart latch opening in the transfer assembly engagement element when the clamp engagement element disengages from the clamp fixture.

Various embodiments are described, wherein the cart latch is configured to disengage the cart latch opening in the transfer assembly engagement element when the clamp engagement element engages the clamp fixture.

Various embodiments are described, wherein the transfer assembly includes cart latch biasing member configured to bias the cart latch towards engaging the cart latch opening in the transfer assembly engagement element.

Various embodiments are described, wherein the transfer assembly includes a guide extending from the transfer assembly towards the clamp fixture, configured to align the transfer assembly with the clamp fixture.

Various embodiments are described, wherein the transfer assembly includes a guide extending from the transfer assembly towards the cart engagement assembly, configured to align the transfer assembly with the cart engagement assembly.

Various embodiments are described, wherein the clamp fixture includes cart latch engagement surface configured to engage and move the cart latch to unlock the cart engagement assembly from the transfer assembly when the transfer assembly engages the clamp fixture.

Various embodiments are described, wherein the transfer assembly engagement element includes clamp latch engagement surface configured to engage and move the clamp latch to unlock the transfer assembly from the clamp fixture when the cart engagement assembly engages the transfer assembly.

Further various embodiments relate to a medical device transfer system configured to transfer a medical device to a bed rail, including: a clamp fixture including: a first clamp configured to clamp onto the bed rail having a first clamp engagement opening, a second clamp configured to clamp onto the bed rail having a second clamp engagement opening; and connection member connecting the first clamp and the second clamp; a transfer assembly configured to be attached to the medical device including a first transfer element including: a first clamp latch; a first cart latch; a first clamp engagement element configured to engage the first clamp engagement opening, and a first cart engagement opening, and a second transfer element including: a second clamp latch; a second cart latch; a second clamp engagement element configured to engage the second clamp engagement opening; and a second cart engagement opening, and a cart engagement assembly configured to engage the transfer assembly and to connect to a cart including first and second transfer assembly engagement elements, wherein the first and the second transfer assembly engagement elements are configured to engage the first and second cart engagement openings respectively, wherein the first and second clamp latches are configured to lock and unlock the transfer assembly to the clamp fixture, and wherein the first and second cart latches are configured to lock and unlock the cart engagement assembly to the transfer assembly.

Various embodiments are described, wherein the first and second clamp engagement members are tapered and the first and second clamp engagement openings are tapered.

Various embodiments are described, wherein the first and second transfer assembly engagement members are tapered and the first and second cart engagement openings are tapered.

Various embodiments are described, wherein the first and second clamp latches are configured to engage a first and a second clamp latch opening in the clamp fixture, respectively, when the cart engagement assembly disengages from the transfer assembly.

Various embodiments are described, wherein the first and second clamp latches are configured to disengage the first and second clamp latch openings, respectively, in the clamp fixture when the cart engagement assembly engages the transfer assembly.

Various embodiments are described, wherein the transfer assembly includes first and second clamp latch biasing members configured to bias the first and second clamp latches towards engaging the first and second clamp latch openings, respectively.

Various embodiments are described, wherein the first and second cart latches are configured to engage the first and second cart latch openings, respectively, when the clamp engagement element disengages from the clamp fixture.

Various embodiments are described, wherein the first and second cart latches are configured to disengage the first and second cart latch openings, respectively, when the clamp engagement element engages the clamp fixture.

Various embodiments are described, wherein the transfer assembly includes first and second cart latch biasing members configured to bias the first and second cart latches, respectively, towards engaging the first and second cart latch opening, respectively.

Various embodiments are described, wherein the first transfer element includes a first guide extending from the first transfer element towards the clamp fixture, configured to align the transfer assembly with the clamp fixture, and the second transfer element includes a second guide extending from the second transfer element towards the clamp fixture, configured to align the transfer assembly with the clamp fixture.

Various embodiments are described, wherein the first transfer assembly includes a first guide extending from the first transfer element towards the cart engagement assembly, configured to align the transfer assembly with the cart engagement assembly, and the second transfer assembly includes a second guide extending from the second transfer element towards the cart engagement assembly, configured to align the transfer assembly with the cart engagement assembly.

Various embodiments are described, wherein the first clamp includes first cart latch engagement surface configured to engage and move the first cart latch to unlock the cart engagement assembly from the transfer assembly when the transfer assembly engages the clamp fixture, and the second clamp includes second cart latch engagement surface configured to engage and move the second cart latch to unlock the cart engagement assembly from the transfer assembly when the transfer assembly engages the clamp fixture.

Various embodiments are described, wherein the first transfer assembly engagement element includes first clamp latch engagement surface configured to engage and move the first clamp latch to unlock the transfer assembly from the clamp fixture when the cart engagement assembly engages the transfer assembly, and the second transfer assembly engagement element includes second clamp latch engagement surface configured to engage and move the second clamp latch to unlock the transfer assembly from the clamp fixture when the cart engagement assembly engages the transfer assembly.

BRIEF DESCRIPTION OF THE DRAWINGS

In order to better understand various exemplary embodiments, reference is made to the accompanying drawings, wherein:

FIGS. 8A and 8B illustrate two views of the transfer element with the clamp latch and cart latch in their positions for the combined transfer element, medical device, and cart engagement assembly as shown in FIG. 7;

FIG. 8C illustrates just the clamp latch and the cart latch with the transfer assembly engagement element;

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, “or,” as used herein, refers to a non-exclusive or (i.e., and/or), unless otherwise indicated (e.g., “or else” or “or in the alternative”). Also, the various embodiments described herein are not necessarily mutually exclusive, as some embodiments can be combined with one or more other embodiments to form new embodiments.

Medical devices are often shared among patients and locations, such as surgical robots or medical imaging devices. These devices may be carried by a cart to the needed location and patient. The medical device may be transferred to a bed rail of the bed holding the patient. The medical device then is securely mounted to the bed rail and the cart is withdrawn from the medical device and may be moved out of the way.

A clamping mechanism may be used in order for the medical device to be securely mounted to the bed rail. Embodiments of a transfer mechanism that allows for the medical device to be securely connected to a bed rail will be described herein. Further, once the medical device is connected to the bed rail, the cart may be disengaged from the medical device and removed from the area. Then when the medical device is to be removed from the bed rail, the cart may reengage the medical device and remove the medical device from the bed rail. This will be accomplished using a series of movable latches driven by torsion springs to lock and unlock the medical device when transferred on and off of the bed rail. The latches allow for the medical device to be rigidly connected to the cart as well as rigidly connected to the bed rail when transferred to the bed rail.

Further, in many situations the bed rail may be draped so that the transfer mechanism needs to be capable of mounting to a draped bed rail. Also, the bed rail may not be perfectly level. The transfer mechanism will include design features that allow for the transfer of the medical device when the bed rail has a slant angle of 1°, 2°, 3°, 4°, or 5°.

Figure 1A:
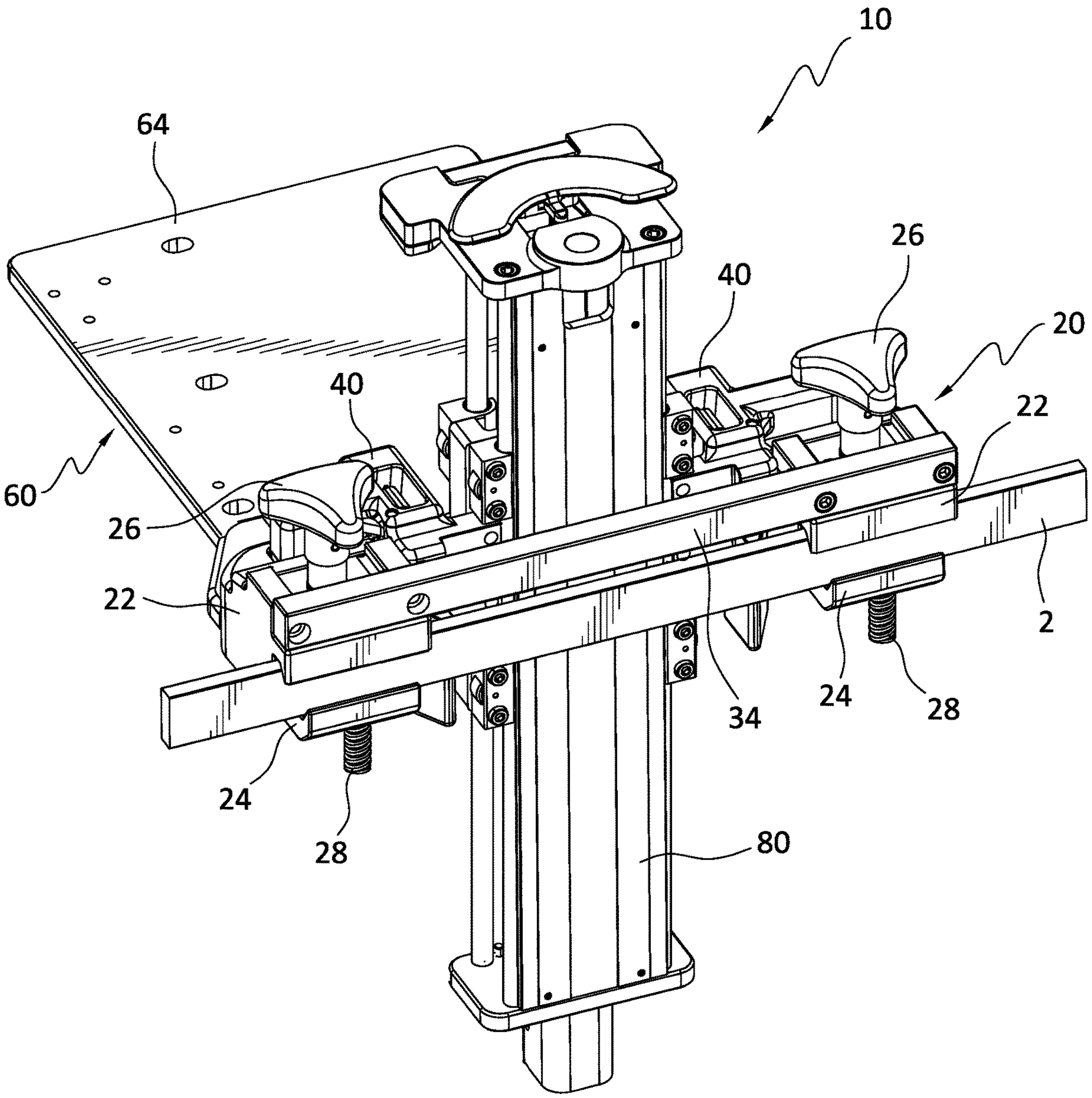
FIGS. 1A and 1B illustrate front and back perspective views of the transfer mechanism.
Figure 1B:
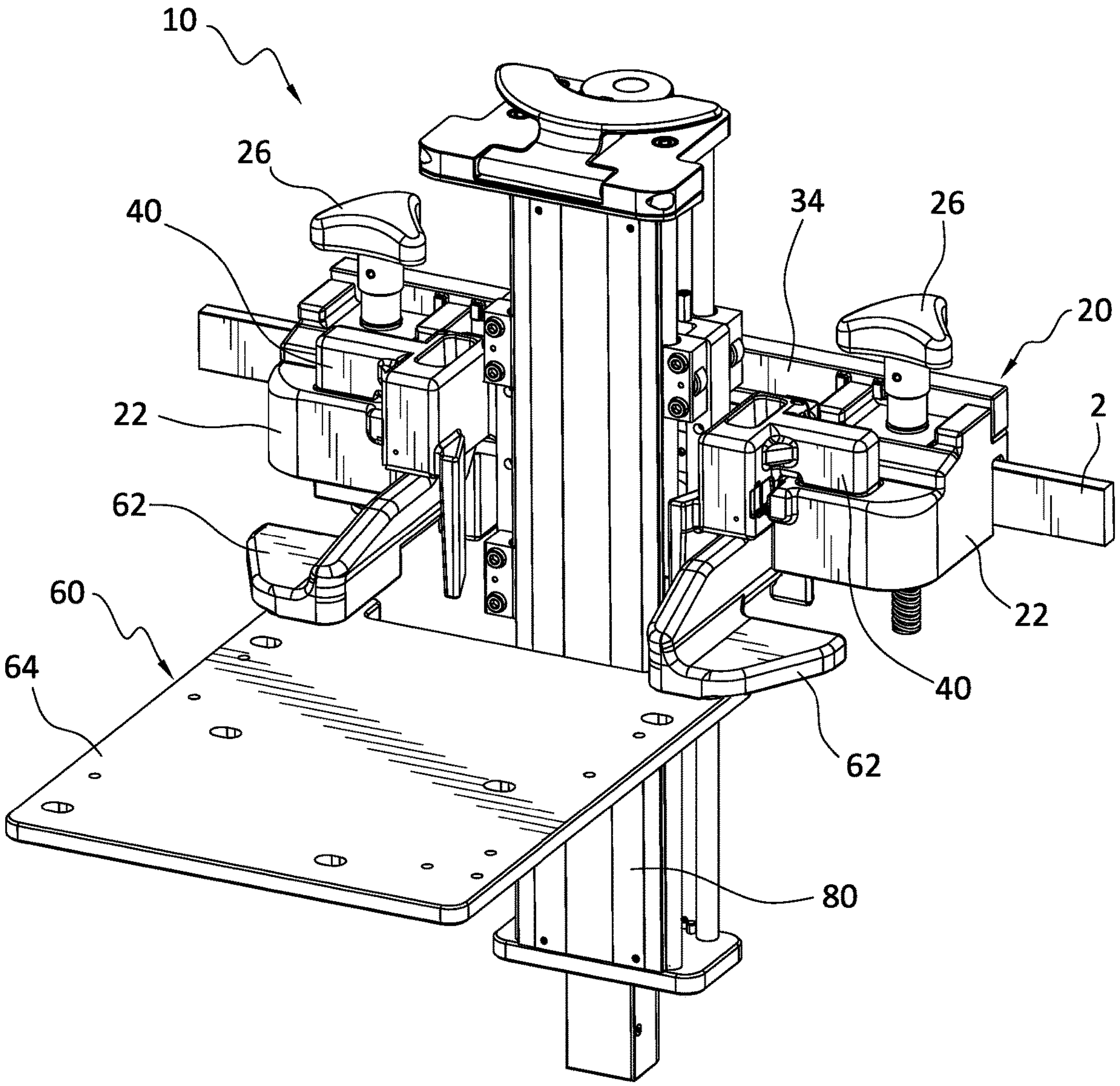

FIGS. 1A and 1B illustrate front and back perspective views of the transfer mechanism. The transfer mechanism 10 includes clamp fixture 20 (see also FIGS. 2A and 2B), a transfer assembly that includes two transfer elements 40 (see FIGS. 3A and 3B), and a cart engagement assembly 60 (see FIGS. 5A and 5B). The transfer elements 40 are attached to the medical device 80. It is noted that many parts of transfer mechanism 10 are symmetric, meaning that there are two instances of various parts that are mirror images of each other. For convenience, each instance of the mirrored parts will have the same reference number as the function of each of these mirrored parts are the same and the shapes are just mirror images of one another.

Figure 2A:
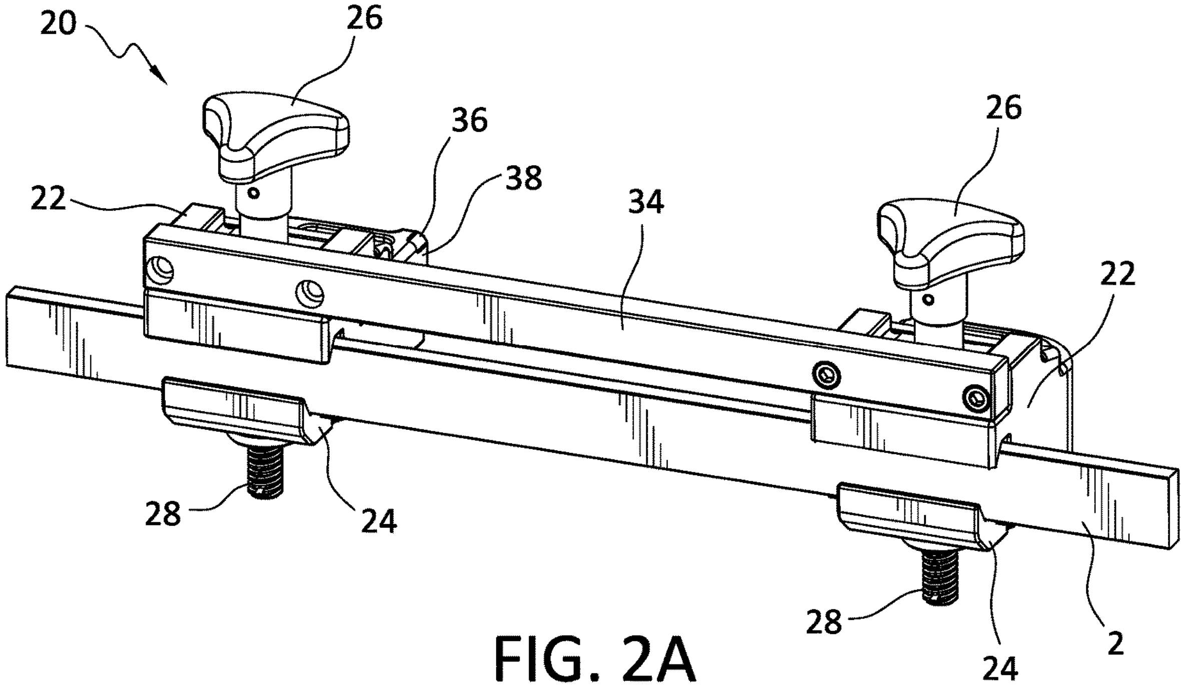
FIGS. 2A and 2B illustrate front and back perspective views of the clamp fixture.
Figure 2B:
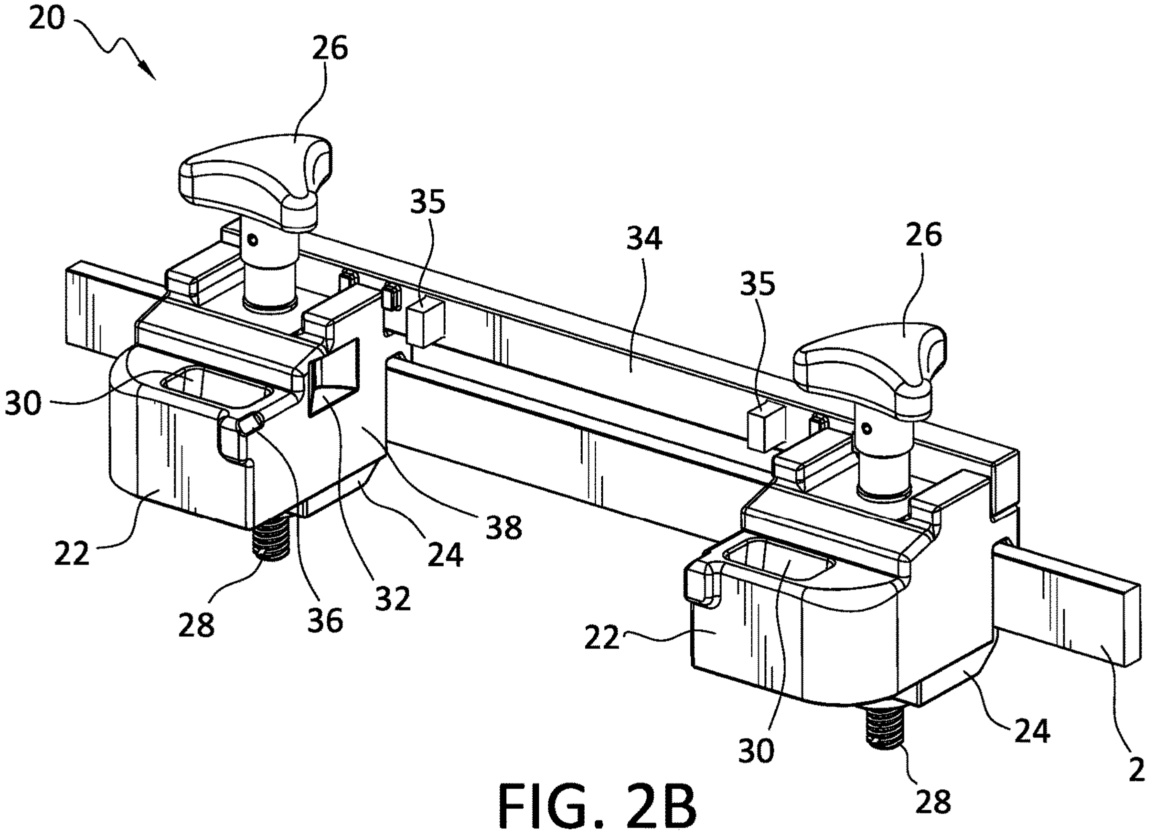

FIGS. 2A and 2B illustrate front and back perspective views of the clamp fixture 20. The clamp fixture includes upper clamps 22, lower clamps 24, clamp knobs 26, clamp screws 28, and a clamp connector bar 34. The clamp connector bar 34 is attached to each of the upper clamps 22. The clamp connector bar 34 also includes bosses 35 that extend away from the bed rail towards the cart. It is noted that in other embodiments the clamp connector bar 34 may be instead connected to the lower clamps 24. The clamp screws 28 engage both the upper clamps 22 and the lower clamps 24, so that the upper clamps 22 and lower clamps 24 may be moved relative to one another when the clamp screw 28 is rotated. Clamp knobs 28 are connected to the clamps screws 28 to facilitate the rotation of clamp screw 28 in order to facilitate the opening and closing of the clamp fixture 20 on the bed rail 2.

The upper clamp 22 further includes a clamp engagement opening 30. This clamp engagement opening 30 is configured to receive a clamp engagement element 42 (see FIGS. 3A and 3B). The clamp engagement opening 30 extends into the upper clamp 22 and has a shape that is complementary to the clamp engagement element 42 to facilitate engagement between the two items. The inside walls of the clamp engagement opening 30 may be sloped so that the opening tapers to facilitate proper and rigid engagement of the medical device 80 when the bed rail may be slanted. While the clamp engagement opening 30 is shown as having a rectangular shape with rounded corners, other shapes may be used as well.

The upper clamp 22 further includes a clamp latch opening 32. The clamp latch opening 32 is configured to receive a clamp latch 44 (see FIGS. 8B, 9, 10A, and 10B) in order to fix or lock the transfer assembly via the transfer elements 40 to the clamp fixture 20. This operation will be further described below.

The upper clamp 22 further includes a first cart latch engagement surface 36. The first cart latch engagement surface 36 is a sloped surface configured to engage with a cart latch 48 (see FIGS. 8B, 9, 10A, and 10B). The first cart engagement surface 36 causes the cart latch 48 to rotate so that the cart latch 48 disengages from the cart engagement assembly 60. Then the cart may be maneuvered away from the medical device and the surgical bed. This will be described further below.

In other embodiments, the upper clamp 22 and lower clamp 24 may be swapped. That is, the upper clamp is just a clamping member and the lower clamp has the various structural elements of the upper clamp. In this situation the clamp connector bar 34 may be connected to the lower clamps to form the clamp fixture 20.

Figure 3A:
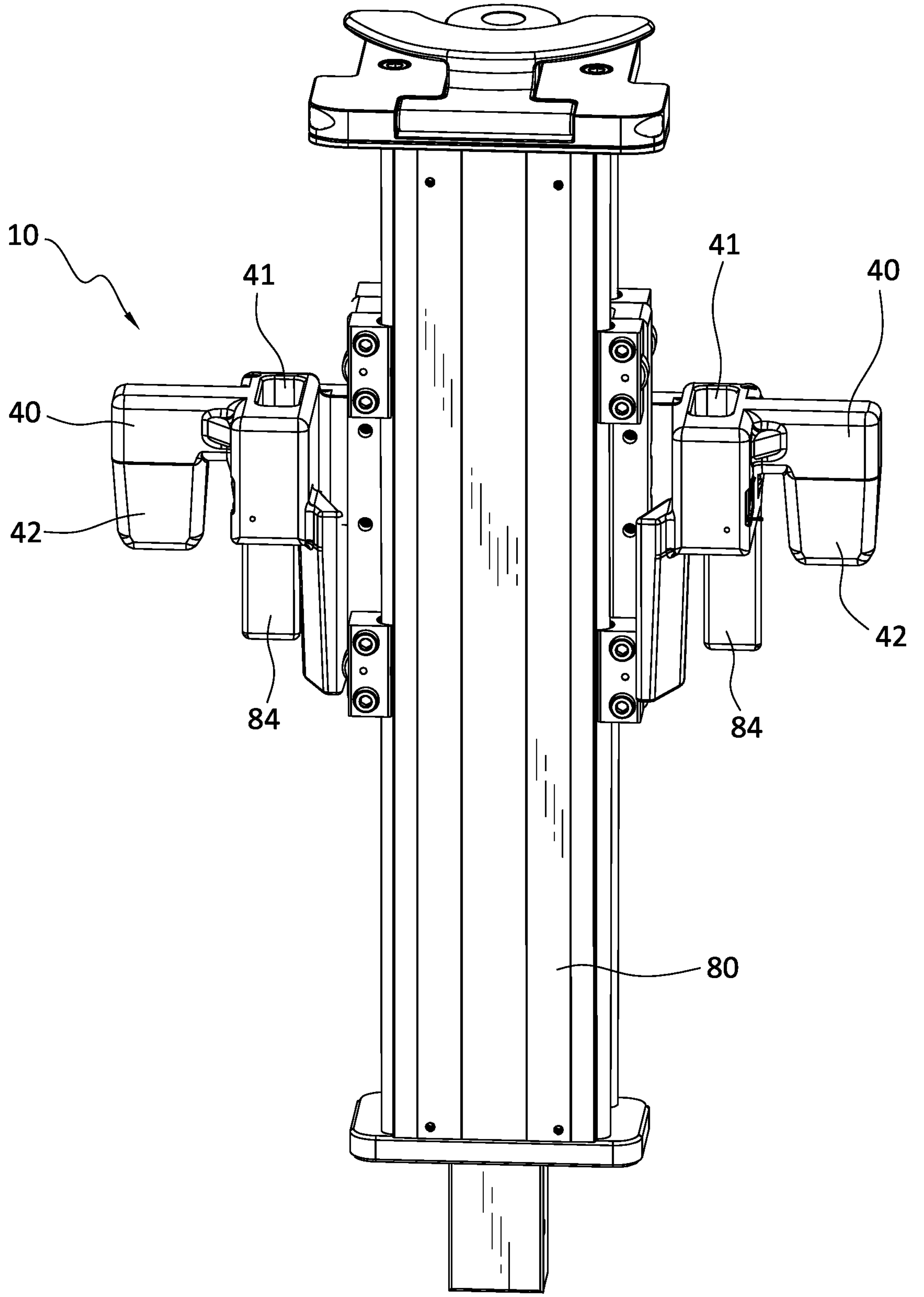
FIGS. 3A and 3B illustrate front and back views of the transfer assembly attached to the medical device.
Figure 3B:
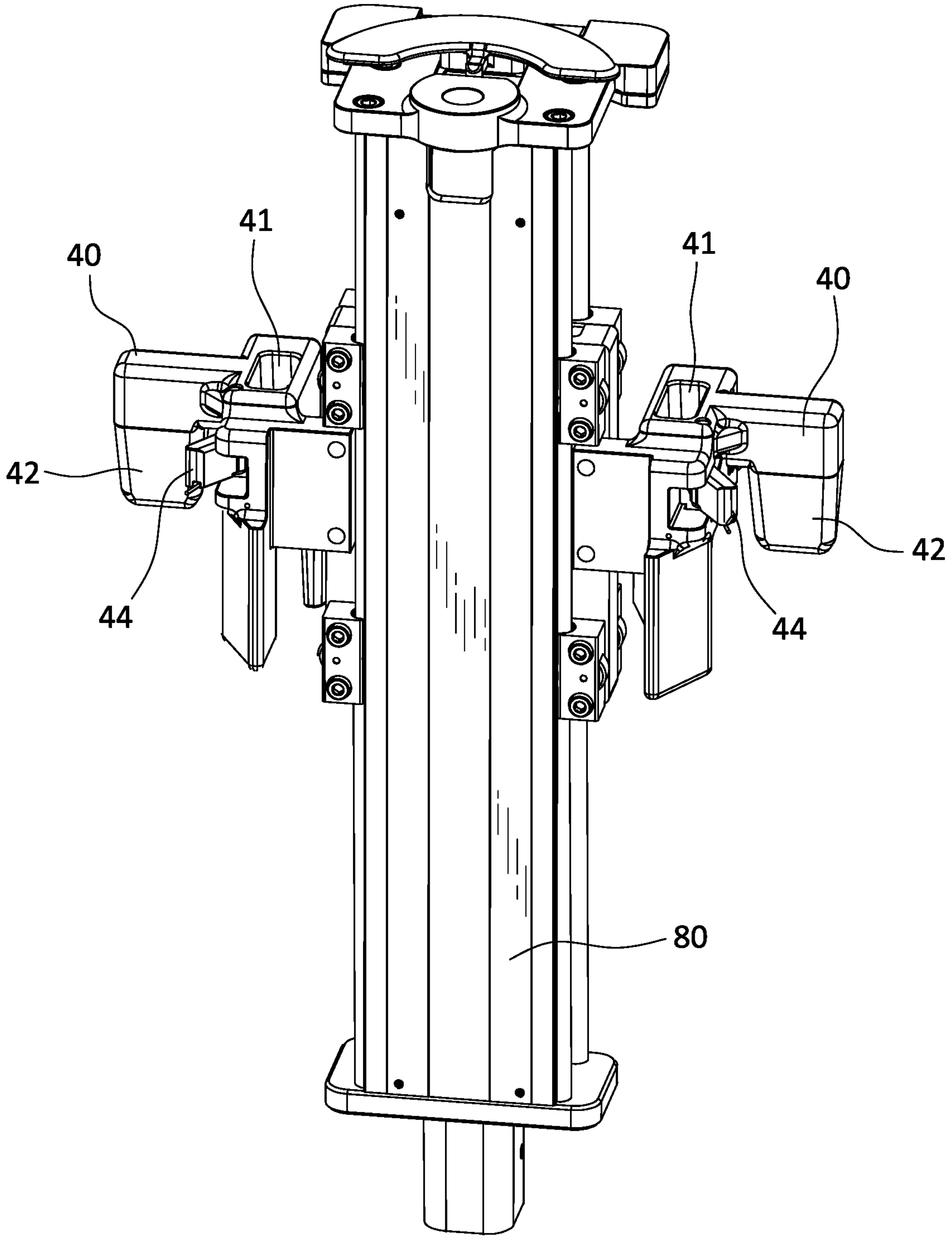
Figure 4A:
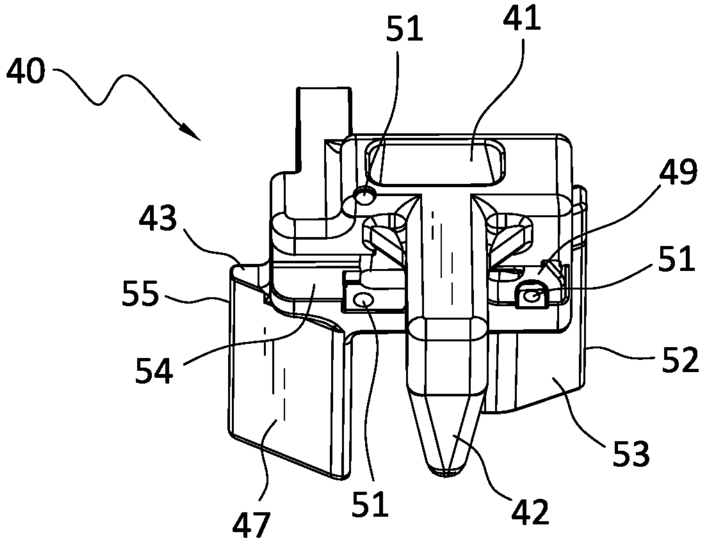
FIGS. 4A-C illustrate three different perspective views of the transfer element.
Figure 4B:
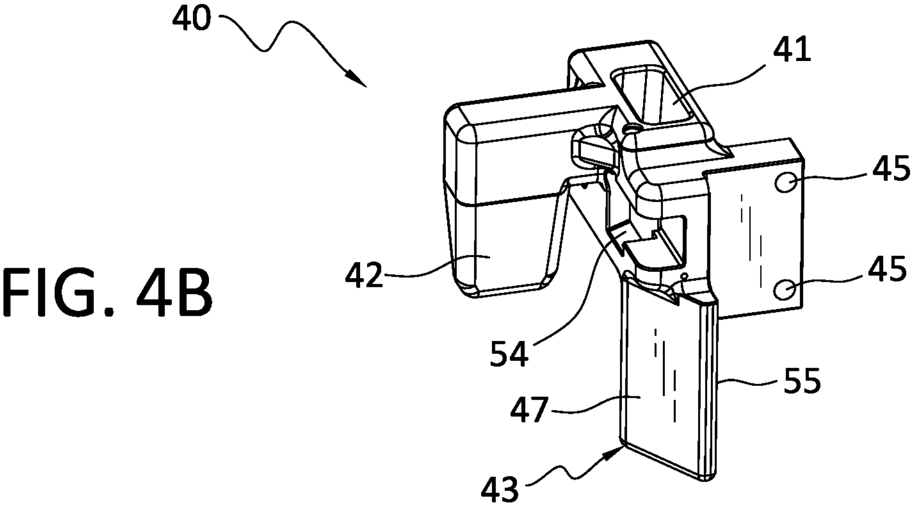
Figure 4C:
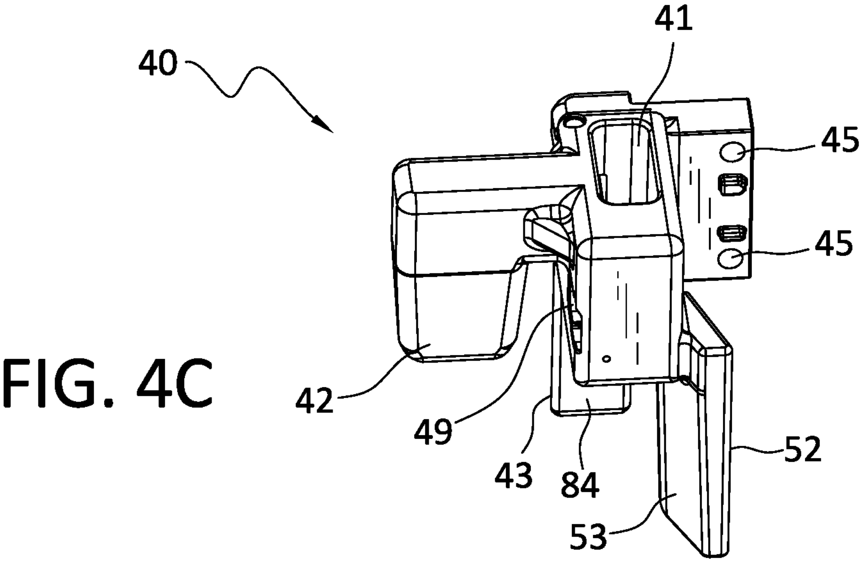

FIGS. 3A and 3B illustrate front and back views of the transfer assembly attached to the medical device 80. FIGS. 4A-C illustrate three different perspective views of the transfer element 40. The transfer element 40 includes a clamp engagement element 42 that is configured to engage the clamp engagement opening 30. The clamp engagement element 42 is shown as having a generally rectangular cross-section with rounded corners that tapers along its length. The shape of the clamp engagement element 42 has a complementary shape to that of the clamp engagement opening 30 to facilitate engagement between the two items. The taper of the clamp engagement element 42 helps to facilitate the proper and rigid engagement of the medical device 80 when the bed rail may be slanted. While the clamp engagement element 42 is shown as having a rectangular shape with rounded corners, other shapes may be used as well.

The clamp engagement element 40 may be connected to the medical device 80 using mounting holes 45. A bolt or other connector may be fed through the mounting hole to securely and rigidly connect the transfer element 40 to the medical device 80.

The transfer element 40 further includes a cart engagement opening 41. This cart engagement opening 41 is configured to receive a transfer assembly engagement element 66 (see FIGS. 6A-D). The cart engagement opening 41 extends into and through the transfer element 40 and has a shape that is complementary to the transfer assembly engagement element 66 to facilitate engagement between the two items. The inside walls of the cart engagement opening 41 may be sloped so that the opening tapers to facilitate proper and rigid engagement of the medical device 80 when the bed rail may be slanted. While the cart engagement opening 41 is shown as having a rectangular shape with rounded corners, other shapes may be used as well.

The transfer element 40 includes first guides 43. The first guides 43 extend downward and also in a direction towards the clamp fixture 20 with forward edges 55. The first guides 43 have a first guide outer surface 47 that is at an angled relative to the rest of the transfer element 40. The first guides 43 are configured to engage an upper clamp inner surfaces 38. As will be described below, when the transfer mechanism 10 approaches the clamp fixture 20, the first guides 43 will help guide the transfer mechanism 10 into proper alignment with the clamp fixture 20. The first guide outer surfaces 47 may come into contact with the adjacent upper clamp inner surfaces 38 and then guide the transfer mechanism 10 including medical device 80 and the cart into the proper alignment. The forward edges 55 of the first guides 43 will also engage the bosses 35 on the clamp connector bar 34 to limit and stop the forward movement of the cart towards the clamp fixture 20.

The transfer element 40 includes second guides 52. The second guides 52 extend downward and also in a direction towards the cart engagement assembly 60. The second guides 52 have a second guide outer surface 53 that is at an angled relative to the rest of the transfer element 40. The second guides 52 are configured to engage a cart engagement inner surfaces 76. As will be described below, when the cart engagement assembly 60 approaches the transfer elements 40, the second guides 52 will help guide the cart engagement assembly 60 into proper alignment with the transfer elements 40. The second guides 52 may come into contact with the adjacent cart engagement inner surfaces 76 and then guide the cart engagement assembly 60 including the cart into the proper alignment with the transfer elements 40.

The transfer element 40 includes a clamp latch opening 54 that holds the clamp latch 44 and a cart latch opening 49 that holds the cart latch 48. The transfer element 40 also includes latch pin openings 51 that accept latch pins 82 (not shown here, see FIGS. 8A, 8B, and 8C) that attach the clamp latch 44 and the cart latch 48 to the transfer element 40 while allowing the latches to rotate about the latch pins.

While the transfer element 40 is illustrated as two items connected to the medical device 80, the two transfer elements 40 may also be connected to one another using other structural elements, and then this combination of elements may be then connected to the medical device 80. Further, while embodiments using two clamp latches and two cart latches are illustrated, embodiments using only one clamp latch on one cart latch may be implemented as well.

Figure 5A:
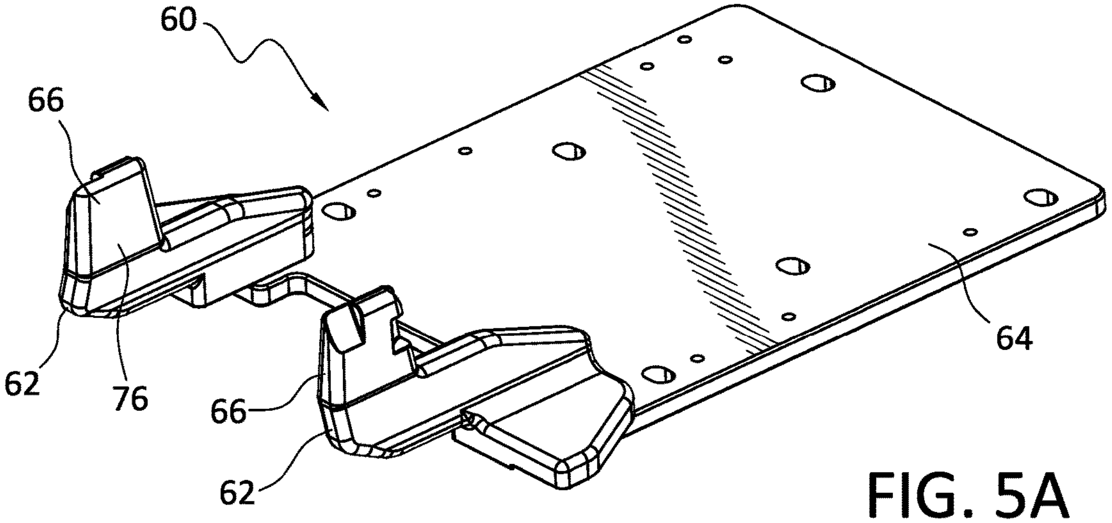
FIGS. 5A and 5B illustrate a top perspective view and bottom perspective view of the cart engagement assembly.
Figure 5B:
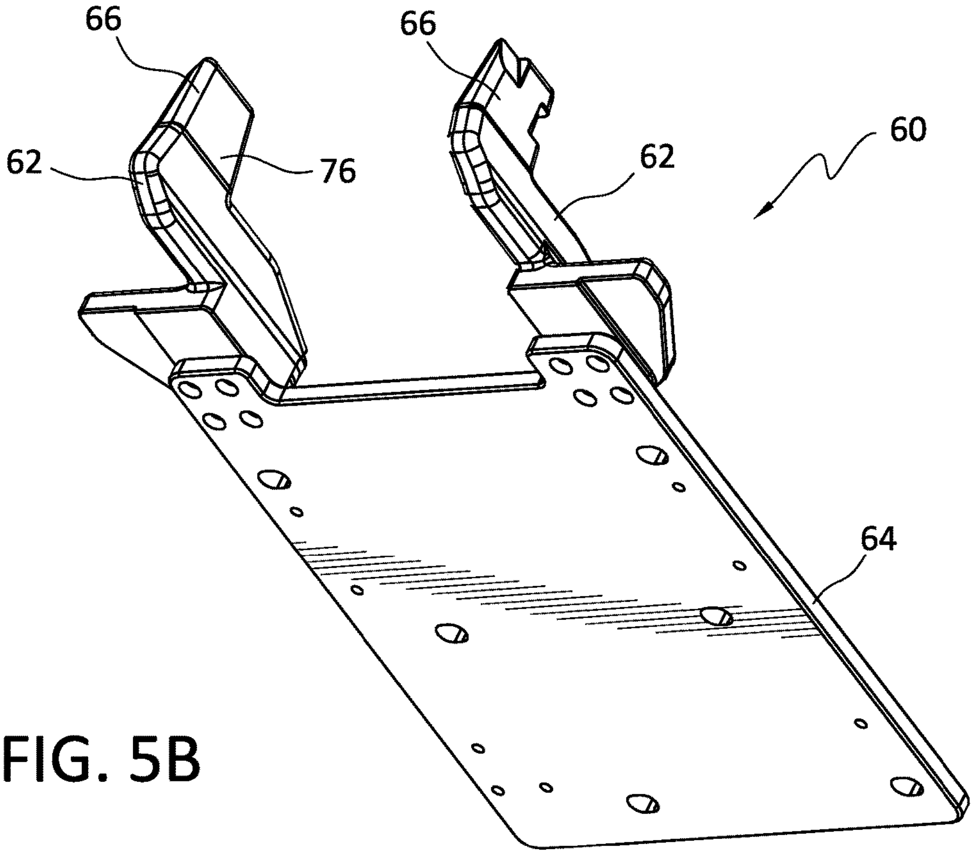
Figure 6A:
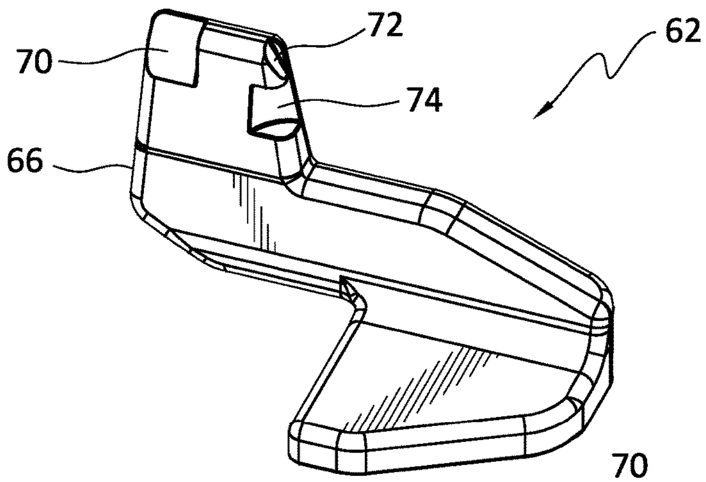
FIGS. 6A-D illustrate various perspective views of the cart engagement element.
Figure 6B:
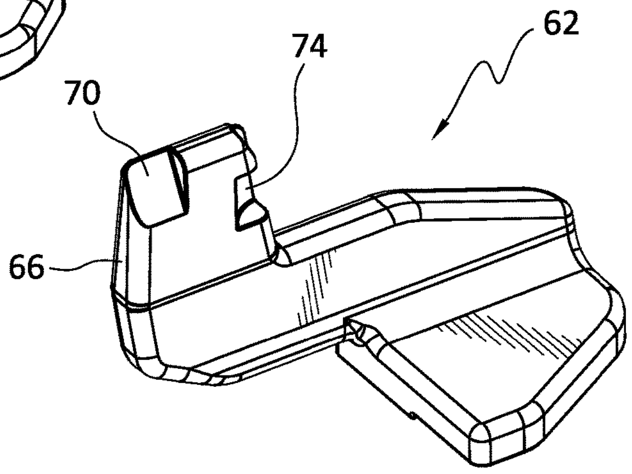
Figure 6C:
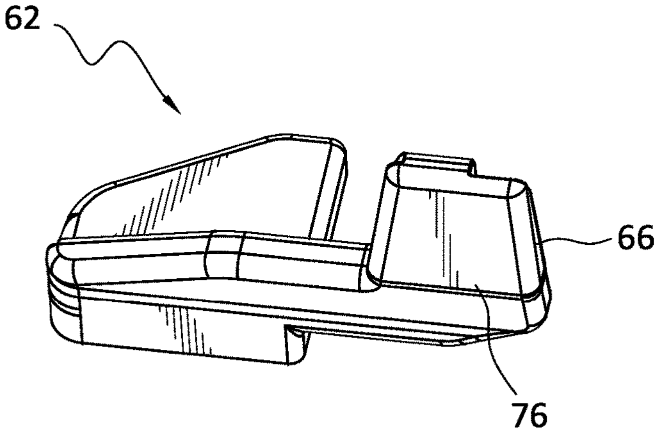
Figure 6D:
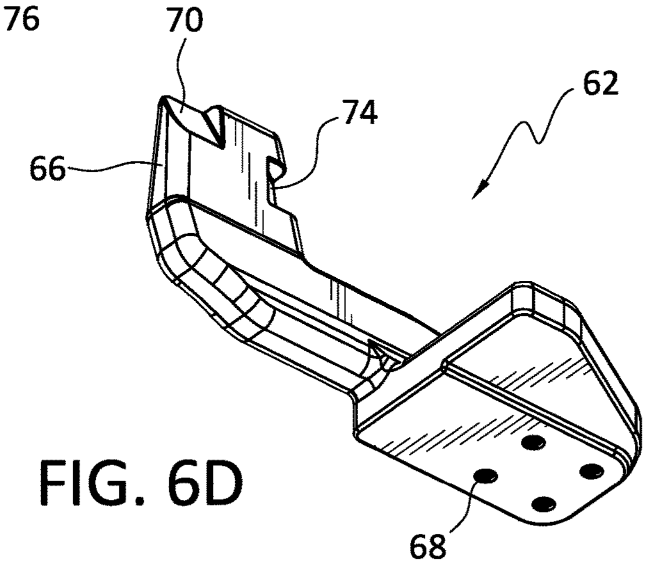

FIGS. 5A and 5B illustrate a top perspective view and bottom perspective view of the cart engagement assembly 60. The cart engagement assembly includes two transfer assembly elements 62 and a cart mount member 64 The cart mount member 64 connects to the cart (not shown for convenience) and may be raised and lowered by the cart in order to facilitate the transfer of the medical device 80 to the bed rail 2. While the cart mount member 64 is shown as a plate, it may have any other shape as dictated by the design of the cart. The two transfer engagement elements 62 are attached to the cart mount element 64. Thus the two transfer assembly elements 62 are moved up and down as the cart moves the cart mount element 64 up and down.

FIGS. 6A-D illustrate various perspective views of the transfer assembly element 62. The transfer assembly element 62 may include holes 68 that allow the transfer assembly element 62 to be connected to the cart mount element 64. The size, number, and location of the holes 68 may be selected to provide adequate connection between the transfer assembly element 62 and the cart mount element 64.

The transfer assembly element 62 includes a transfer assembly engagement element 66 that is configured to engage the cart engagement opening 41. The transfer assembly engagement element 66 is shown as having a generally rectangular cross-section with rounded corners that tapers along its length. The shape of the transfer assembly engagement element 66 has a complementary shape to that of the cart engagement opening 41 to facilitate engagement between the two items. The taper of the transfer assembly engagement element 66 helps to facilitate the proper and rigid engagement of the medical device 80 when the bed rail 2 may be slanted. While the transfer assembly engagement element 66 is shown as having a rectangular shape with rounded corners, other shapes may be used as well.

The transfer assembly engagement element 66 further includes a clamp latch engagement surface 70. The clamp latch engagement surface 70 is a sloped surface configured to engage with a clamp latch 44. The clamp engagement surface 70 causes the clamp latch 44 to rotate so that the clamp latch 44 disengages from the clamp engagement opening 32 and hence the clamp fixture 20 so that the transfer elements 40 may be disengaged from the clamp fixture 20. This will be described further below.

The transfer assembly engagement element 66 further includes a second cart latch engagement surface 72. The second cart latch engagement surface 72 is a sloped surface configured to engage with a cart latch 48. The second cart engagement surface 72 causes the cart latch 48 to rotate so that the cart latch 48 rotates out of the cart engagement opening 41 so that the transfer assembly engagement element 66 may move into the cart engagement opening 41. Once the transfer assembly engagement element 66 is completely within the cart engagement opening 41, the cart latch 48 now aligns with a cart latch opening 74, and a cart latch biasing element 50 rotates the cart latch 48 into the cart latch opening 74 in order to fix or lock the cart engagement assembly 60 to the transfer elements 40. This operation will be further described below.

Figure 7:
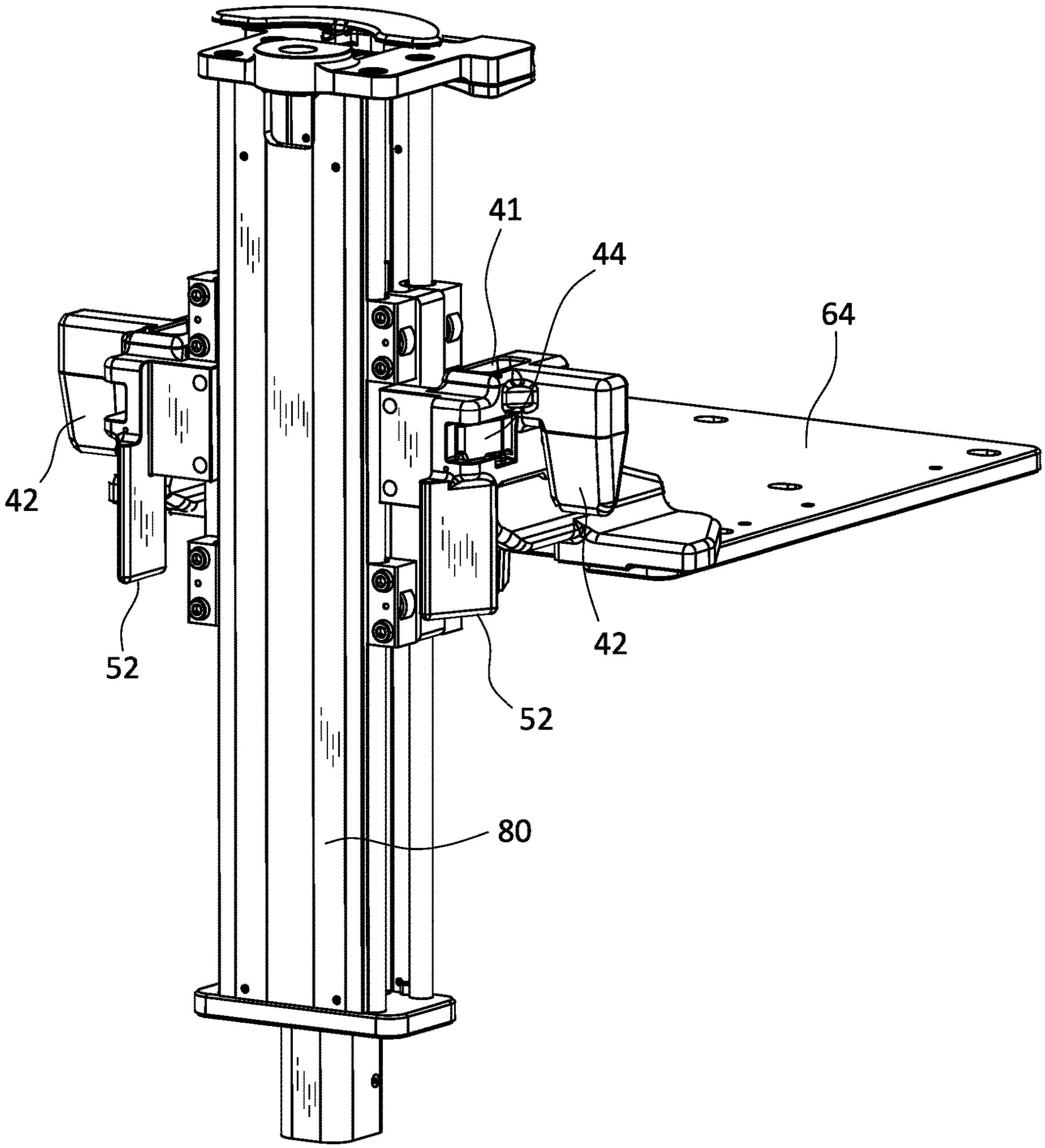
FIG. 7 illustrates a front perspective view of the combined transfer element, medical device, and cart engagement assembly.

FIG. 7 illustrates a front perspective view of the combined transfer element 40, medical device 80, and cart engagement assembly 60. The cart (not shown, but attached to the cart engagement assembly 60) may be used to bring this combination of elements towards the clamp fixture 20 attached to the bed rail 2. The transfer elements 40 would be raised so that the clamp engagement elements 42 were above the upper clamp 22. The cart would then be moved towards the clamp fixture 20. As transfer assemblies 42 approach the clamp fixture 20, the first guides 43 may engage the upper clamp inner surface 38 and guide the transfer element 40 and the medical device 80 into a properly aligned position relative to the clamp fixture 20 once the cart moves forward as far as possible. Bosses 35 on the clamp connector bar 34 extend towards the cart and interface with a forward edge 55 on the first guides to stop the forward movement of the cart. This helps to align the transfer element 40 with the clamp fixture. Further, the forward edge 55 will not engage the rail 2. Next, the cart lowers the transfer element 40 and the medical device towards the clamp fixture 20. As the transfer element 40 is lowered, the clamp engagement elements 42 enter the clamp engagement openings 30. In the case where one or both of the clamp engagement elements 42 and the clamp engagement openings 30 have sloped surfaces and tapered profiles, there is an increased tolerance on the required alignment between the clamp engagement elements 42 and the clamp engagement openings 30. Because if there is some misalignment, the narrower distal end of the clamp engagement elements 42 will still be within the wider boundaries of the upper portion of the clamp engagement openings 30. Then as the clamp engagement elements 42 lower, the sloped surfaces will cause the clamp engagement elements 42 and the clamp engagement openings 30 to engage and properly align. As discussed above, the sloped surfaces also allow for the engagement of the clamp engagement elements 42 and the clamp engagement openings 30 even when the bed rail has a slant.

FIGS. 8A and 8B illustrate two views of the transfer element 40 with the clamp latch 44 and cart latch 48 in their positions for the combined transfer element 40, medical device 80, and cart engagement assembly 60 as shown in FIG. 7. FIG. 8C illustrates just the clamp latch 44 and the cart latch 48 with the transfer assembly element 62. In the configuration shown in FIG. 7, The transfer assembly engagement element 66 is inserted in the cart engagement opening 41. As a result the clamp latch 44 is rotated so that is remains largely in the clamp latch opening 54 because a first end 44*a* of the clamp latch 44 is kept out of the cart engagement opening 41. The clamp latch biasing element 46 (in this example a torsion spring) biases the clamp latch 44 (clockwise in FIG. 8A) so that clamp latch 44 will rotate out of the clamp latch opening 54, if there is nothing to prevent that rotation, but in this situation the transfer assembly engagement element 66 prevents that rotation.

The cart latch 48 is shown as rotated out of the cart latch opening 49. A first end 48*a* of the cart latch 48 extends into the cart engagement opening 41 and the cart latch opening 74. With the cart latch 48 in this position, the cart engagement assembly 60 is locked to the transfer element 40, because the cart latch 48 prevents the transfer assembly engagement element 66 from be removed from the cart engagement opening 41. Further, a second end 48*b* of the cart latch extends out from the transfer element 40.

Figure 9:
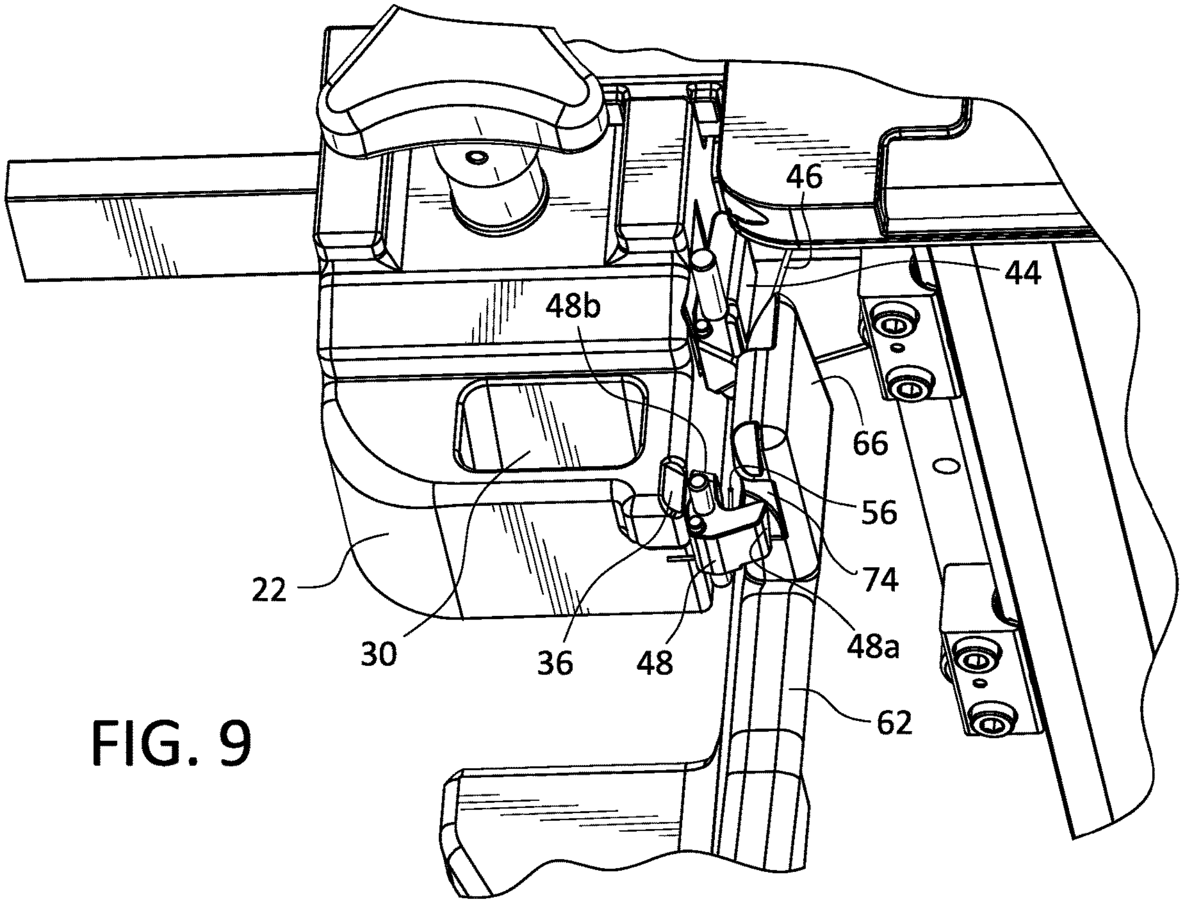
FIG. 9 illustrates transfer mechanism with the transfer element engaged with the clamp fixture, but the left transfer element has been removed to provide a view of the clamp latch and the cart latch.

As described above with respect to FIG. 7, the cart lowers the transfer element 40 and the medical device towards the clamp fixture 20. FIG. 9 illustrates transfer mechanism with the transfer element 40 engaged with the clamp fixture 20, but the left transfer element 40 has been removed to provide a view of the clamp latch 44 and the cart latch 48. As the transfer element 40 lowers to engage the clamp fixture 20, the second end 48*b* of the cart latch 48 engages the first cart latch engagement surface 36 on the upper clamp 22. This engagement causes the cart latch 48 to rotate so that the first end 48*a* of the cart latch 48 rotates out and way from the cart latch opening 74. In this position, the cart latch 48 resides generally within the cart latch opening 49. This unlocks the transfer assembly engagement elements 66 from the transfer element 40. At this point the cart may lower the cart engagement assembly to separate from the transfer assembly and the medical device 80. This leaves the medical 80 mounted to the bed rail 20 via the clamp fixture and the transfer element 40.

Figure 10A:
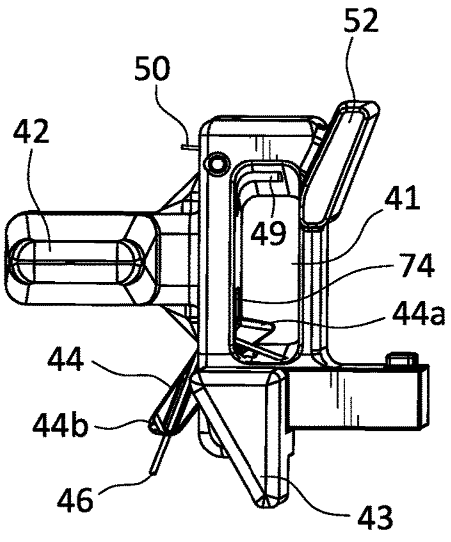
FIGS. 10A and 10B illustrate the position of clamp latch when the transfer element is connected to the clamp fixture 20 and the cart engagement assembly has been disengaged.
Figure 10B:
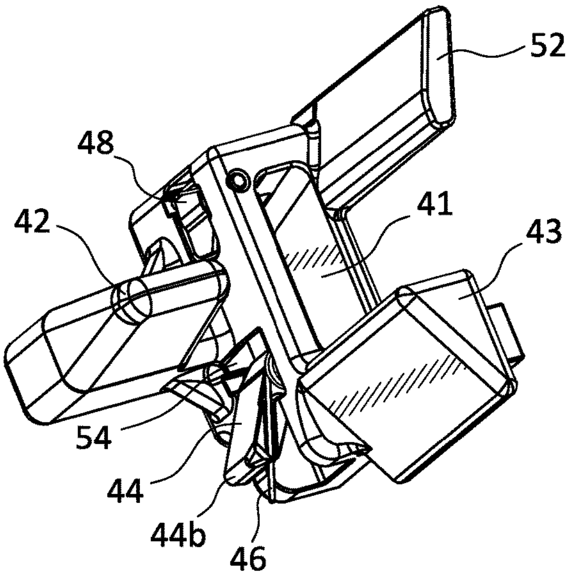

Once the cart engagement assembly 60 has been disengaged from the transfer element 40, the clamp latch 44 locks the transfer assembly to the clamp fixture 20. FIGS. 10A and 10B illustrate the position of clamp latch 44 when the transfer element 40 is connected to the clamp fixture 20 and the cart engagement assembly 60 has been disengaged. As the transfer assembly engagement element 66 is removed from the cart engagement opening 41, the clamp latch biasing element 46 (shown in this example as a torsion spring) biases and rotates the clamp latch 44 so that the first end 44*a* enters into the cart engagement opening 41 and the second end 44*b* of the clamp latch 44 extends into the clamp latch opening 32 (see FIG. 2B). When the clamp latch 44 extends into the clamp latch opening 32, the transfer element 40 is locked to clamp fixture 20. The clamp latch 44 will prevent the transfer element 40 from be lifted out of the clamp fixture 20.

Once medical device 80 has been used it may be removed. The cart with the cart engagement assembly 60 is maneuvered towards the transfer assembly 40. As described above the second guides 52 will engage the transfer assembly elements 62 to align the cart with the transfer element 40. The first guide 43 has a surface 84 which will stop the transfer assembly engagement element's 66 forward motion. Then the cart will raise the cart engagement assembly 60 inserting the transfer assembly engagement elements 66 into the cart engagement opening 41 of the transfer assembly. Inserting the transfer assembly engagement elements 66 causes the first end 44*a* of the clamp latch 44 to rotate out of the cart engagement opening 41. This further causes the second end 44*b* of the clamp latch 44 to rotate out of the clamp latch opening 32 that unlocks the transfer element 40 from the clamp fixture 20.

Once the cart engagement assembly 60 engages the transfer element 40, the cart can further lift the transfer element 40 from the clamp fixture 20 as the clamp latch 44 has been rotated out of the clamp latch opening 32. As the cart raises the transfer element 40 clear of the clamp fixture 20, the cart latch 48 clears the first cart latch engagement surface 36 and is rotated by the cart latch biasing element 50 so the first end 48*a* of the cart latch 48 is rotated back into the cart latch opening 74 of the transfer assembly engagement element. This rotation of the cart latch 48 into the cart latch opening 74 locks the transfer mechanism 40 to the cart engagement assembly. Now the cart can be safely moved to its next location with the transfer mechanism 40 and the medical device 80 securely attached to the cart.

The transfer assembly element 62 includes a second cart latch engagement surface 72. The second cart latch engagement surface 72 causes the cart latch 48 to be rotated out of the way when the first end 48*a* of the cart latch 48 is in the cart engagement opening 41. This situation may arise when the transfer element 40 and the medical device 80 are first placed on the cart engagement assembly 60. It will not arise when the transfer element 40 is connected to the clamp fixture 20 because the first cart latch engagement surface 36 causes the first end 48*a* of the cart latch 48 to rotate out of the cart engagement opening 41.

The transfer mechanism described herein provides a benefit of allowing a medical device (e.g., surgical robot, imaging device, etc.) to be easily and securely attached to a bed rail. The disclosed transfer mechanism includes latches and various mechanical surfaces configured to allow the latches to lock and unlock the medical device to the bed rail and a cart in a sequence to allow for the transfer of the medical device from a cart to the bed rail. Further, various mechanical aspects of the transfer mechanism are designed to allow for the bed rail to have a slight slant. Also the various designs of the elements that engage openings allow for a tolerance in the positioning of the cart during the transfer of the medical device on to and off of the bed rail. Further, as the clamp fixture is easily affixed to the bed rail without the need for tools, the process for transferring a medical device to the bed rail does not require the use of any tools, and hence it simplifies the transfer process as compared to prior systems. Further, the use of the clamp fixture helps to facilitate transferring a medical device to a bed where the bed rail is draped. The clamp fixture is easily clamped to the draped bed rail. Then the cart approached the clamping fixture to easily transfer the medical device to the bed rail as the location of the clamping fixture is clear to the operator of the cart. In prior systems it would be difficult to align a cart with the medical device to a draped bedrail.

While each of the embodiments are described above in terms of their structural arrangements, it should be appreciated that the invention also covers the associated methods of using the embodiments described above.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications and combinations of the various embodiments can be affected while remaining within the spirit and scope of the invention. Accordingly, the foregoing disclosure, description, and figures are for illustrative purposes only and do not in any way limit the invention, which is defined only by the claims.

What is claimed is:

1. A medical device transfer system configured to transfer a medical device to a bed rail, comprising:
- a clamp fixture comprising an upper clamp and a lower clamp movable relative to the upper clamp, wherein the upper clamp and the lower clamp are configured to clamp the bed rail therebetween;
- a transfer assembly configured to be attached to the medical device comprising:
  - a clamp latch;
  - a cart latch;
  - a clamp engagement element configured to engage the clamp fixture; and
  - a cart engagement opening; and
- a cart engagement assembly configured to engage the transfer assembly and to connect to a cart, the cart engagement assembly comprising a transfer assembly engagement element, wherein the transfer assembly engagement element is configured to engage the cart engagement opening,
- wherein the clamp latch is configured to lock and unlock the transfer assembly to the clamp fixture, and
- wherein the cart latch is configured to lock and unlock the cart engagement assembly to the transfer assembly.

2. The medical device transfer system of claim 1, wherein the upper clamp includes a clamp engagement opening configured to receive the clamp engagement element.

3. The medical device transfer system of claim 2, wherein the clamp engagement member is tapered and the clamp engagement opening is tapered.

4. The medical device transfer system of claim 1, wherein the transfer assembly engagement member is tapered and the cart engagement opening is tapered.

5. The medical device transfer system of claim 1, wherein the clamp latch is configured to engage a clamp latch opening in the clamp fixture when the cart engagement assembly disengages from the transfer assembly.

6. The medical device transfer system of claim 5, wherein the clamp latch is configured to disengage the clamp latch opening in the clamp fixture when the cart engagement assembly engages the transfer assembly.

7. The medical device transfer system of claim 6, wherein the transfer assembly comprises clamp latch biasing member configured to bias the clamp latch towards engaging the clamp latch opening in the clamp fixture.

8. The medical device transfer system of claim 1, wherein the cart latch is configured to engage a cart latch opening in the transfer assembly engagement element when the clamp engagement element disengages from the clamp fixture.

9. The medical device transfer system of claim 8, wherein the cart latch is configured to disengage the cart latch opening in the transfer assembly engagement element when the clamp engagement element engages the clamp fixture.

10. The medical device transfer system of claim 9, wherein the transfer assembly comprises cart latch biasing member configured to bias the cart latch towards engaging the cart latch opening in the transfer assembly engagement element.

11. The medical device transfer system of claim 1, wherein the transfer assembly includes a guide extending from the transfer assembly towards the clamp fixture, configured to align the transfer assembly with the clamp fixture.

12. The medical device transfer system of claim 1, wherein the transfer assembly includes a guide extending from the transfer assembly towards the cart engagement assembly, configured to align the transfer assembly with the cart engagement assembly.

13. The medical device transfer system of claim 1, wherein the clamp fixture includes cart latch engagement surface configured to engage and move the cart latch to unlock the cart engagement assembly from the transfer assembly when the transfer assembly engages the clamp fixture.

14. The medical device transfer system of claim 1, wherein the transfer assembly engagement element includes a clamp latch engagement surface configured to engage and move the clamp latch to unlock the transfer assembly from the clamp fixture when the cart engagement assembly engages the transfer assembly.

15. The medical device transfer system of claim 1, further comprising a clamp screw, wherein the lower clamp is movable relative to the upper clamp when the clamp screw is rotated.

16. A medical device transfer system configured to transfer a medical device to a bed rail, comprising:
- a clamp fixture comprising:
  - a first clamp configured to clamp onto the bed rail having a first clamp engagement opening;
  - a second clamp configured to clamp onto the bed rail having a second clamp engagement opening; and
  - connection member connecting the first clamp and the second clamp;
- a transfer assembly configured to be attached to the medical device comprising
  - a first transfer element comprising:
    - a first clamp latch;
    - a first cart latch;
    - a first clamp engagement element configured to engage the first clamp engagement opening; and
    - a first cart engagement opening; and
  - a second transfer element comprising:
    - a second clamp latch;
    - a second cart latch;
    - a second clamp engagement element configured to engage the second clamp engagement opening; and
    - a second cart engagement opening; and
- a cart engagement assembly configured to engage the transfer assembly and to connect to a cart comprising first and second transfer assembly engagement elements, wherein the first and the second transfer assembly engagement elements are configured to engage the first and second cart engagement openings respectively, wherein the first and second clamp latches are configured to lock and unlock the transfer assembly to the clamp fixture, and
- wherein the first and second cart latches are configured to lock and unlock the cart engagement assembly to the transfer assembly.

17. The medical device transfer system of claim 16, wherein the first and second clamp engagement members are tapered and the first and second clamp engagement openings are tapered.

18. The medical device transfer system of claim 16, wherein the first and second transfer assembly engagement members are tapered and the first and second cart engagement openings are tapered.

19. The medical device transfer system of claim 16, wherein the first and second clamp latches are configured to engage a first and a second clamp latch opening in the clamp fixture, respectively, when the cart engagement assembly disengages from the transfer assembly.

20. The medical device transfer system of claim 19, wherein the first and second clamp latches are configured to disengage the first and second clamp latch openings, respectively, in the clamp fixture when the cart engagement assembly engages the transfer assembly.

21. The medical device transfer system of claim 20, wherein the transfer assembly comprises first and second clamp latch biasing members configured to bias the first and second clamp latches towards engaging the first and second clamp latch openings, respectively.

22. The medical device transfer system of claim 16, wherein the first and second cart latches are configured to engage the first and second cart latch openings, respectively, when the clamp engagement element disengages from the clamp fixture.

23. The medical device transfer system of claim 22, wherein the first and second cart latches are configured to disengage the first and second cart latch openings, respectively, when the clamp engagement element engages the clamp fixture.

24. The medical device transfer system of claim 23, wherein the transfer assembly comprises first and second cart latch biasing members configured to bias the first and second cart latches, respectively, towards engaging the first and second cart latch opening, respectively.

25. The medical device transfer system of claim 16, wherein the first transfer element includes a first guide extending from the first transfer element towards the clamp fixture, configured to align the transfer assembly with the clamp fixture, and the second transfer element includes a second guide extending from the second transfer element towards the clamp fixture, configured to align the transfer assembly with the clamp fixture.

26. The medical device transfer system of claim 16, wherein the first transfer assembly includes a first guide extending from the first transfer element towards the cart engagement assembly, configured to align the transfer assembly with the cart engagement assembly, and the second transfer assembly includes a second guide extending from the second transfer element towards the cart engagement assembly, configured to align the transfer assembly with the cart engagement assembly.

27. The medical device transfer system of claim 16, wherein the first clamp includes first cart latch engagement surface configured to engage and move the first cart latch to unlock the cart engagement assembly from the transfer assembly when the transfer assembly engages the clamp fixture, and the second clamp includes second cart latch engagement surface configured to engage and move the second cart latch to unlock the cart engagement assembly from the transfer assembly when the transfer assembly engages the clamp fixture.

28. The medical device transfer system of claim 16, wherein the first transfer assembly engagement element includes first clamp latch engagement surface configured to engage and move the first clamp latch to unlock the transfer assembly from the clamp fixture when the cart engagement assembly engages the transfer assembly, and the second transfer assembly engagement element includes second clamp latch engagement surface configured to engage and move the second clamp latch to unlock the transfer assembly from the clamp fixture when the cart engagement assembly engages the transfer assembly.

* * * * *